XR 4,019,178

United States
Hashimoto et al.

4,019,178

Apr. 19, 1977

[54] CMOS DRIVE SYSTEM FOR LIQUID CRYSTAL DISPLAY UNITS

[75] Inventors: Shintaro Hashimoto, Nara; Hirohide Nakagawa, Sakurai, both of Japan

[73] Assignee: Sharp Kabushiki Kaisha, Osaka, Japan

[22] Filed: Apr. 4, 1975

[21] Appl. No.: 565,269

[30] Foreign Application Priority Data

Apr. 5, 1974 Japan ............................ 49-39336

[52] U.S. Cl. .......................... 340/324 M; 340/336; 350/160 LC

[51] Int. Cl.[2] .......................................... G06F 3/14

[58] Field of Search ........ 340/324 M, 336, 166 EL; 350/160 LC

[56] References Cited

UNITED STATES PATENTS 3,895,372 7/1975 Kaji et al. .................... 340/324 M

OTHER PUBLICATIONS

RCA Product Guide, No. CDL-820D, Publ. 8–71, p. 31.

*CMOS – Why Is It So Good*, Lancaster, Radio–Electronics, Dec. 1973, pp. 33–36, 88 & 89.

*Primary Examiner*—Marshall M. Curtis
*Attorney, Agent, or Firm*—Birch, Stewart, Kolasch & Birch

[57] ABSTRACT

The present disclosure is directed toward a system for driving a plurality of liquid crystal display units each having a common electrode, a plurality of segment electrodes and a liquid crystal composition interposed between the said electrodes. First, second and third voltage levels are determined with respect to a reference level in such a manner that a voltage difference between any possible combinations and the reference level except the combination of the third level and the reference level is not higher than a given threshold voltage which initiates enabling of the liquid crystal display units. When the liquid crystal display units are desired to be energized, signals of the reference level and the third level are alternatively applied to the common electrode, whereas the inversion thereof is applied to the segment electrodes. When the liquid crystal display units are desired to be disabled, a signal either of the first or second level is applied to at least one of said electrodes.

3 Claims, 9 Drawing Figures

CMOS DRIVE SYSTEM FOR LIQUID CRYSTAL DISPLAY UNITS

BACKGROUND OF THE INVENTION

The present invention relates to an improvement in a system for driving a plurality of liquid crystal display units each having a common electrode, a plurality of segment electrodes and a liquid crystal composition interposed between the said electrodes.

The liquid crystal display units have been adopted for display units in electronic apparatus such as calculators and watches, since the liquid crystal display units can be driven with less power consumption by a power source of a relatively low level and can indicate patterns of large size on a panel.

The conventional liquid crystal dynamic drive system required four kinds of power sources providing first, second, third and fourth voltage levels with respect to a reference level. The common electrode was connected to receive alternating signals bearing the reference level and the fourth level which are symmetrical to each other with respect to the second level, whereas the segment electrodes were connected to receive alternating signals bearing the first level and the third level. Such a liquid crystal dynamic drive system are described in copending application, DRIVE SYSTEM FOR LIQUID CRYSTAL DISPLAY UNITS, Ser. No. 398,850, filed Sept. 19, 1973 by Isamu Washizuka and assigned to the same assignee as the present application, which is now U.S. Pat. No. 3,902,169.

Recently, CMOS's (complementary metal-oxide-semiconductor) have been used in electronic calculators, since the CMOS's consume less energy and require a lower power source. When the conventional dynamic drive system is applied to an electronic calculator comprising a CMOS-LSI including a computation circuit and storage, and liquid crystal display units containing a liquid crystal composition which generally has a given threshold voltage of 18V, it is necessary to provide an amplifier in order to activate the liquid crystal display units since the voltage difference between the reference level and the fourth level must be more than 24V which can not be endured by the CMOS's. Therefore, a liquid crystal drive circuit can not be included within the CMOSLSI. This may cause increase of the cost for fabricating the electronic calculator and increase of power consumption.

SUMMARY OF THE INVENTION

Accordingly, an object of the present invention is to provide a novel system for driving a plurality of liquid crystal display units.

Another object of the present invention is to provide a liquid crystal drive circuit which can be constructed with the use of CMOS's.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to the present invention, first, second and third voltage levels are determined with respect to a reference level in such a manner that voltage difference between the third level and the reference level is higher than a given threshold voltage which initiates enabling of the liquid crystal display units. A voltage difference between any combination selected among the reference level and the first through third levels except the combination of the reference and third levels is below than the threshold voltage. When the liquid crystal display units are desired to be enabled, alternating signals bearing the reference level and the third level are applied to the common electrode and the segment electrodes in a phase-inverted fashion, thereby applying the voltage higher than the threshold voltage across a liquid crystal composition interposed between the said electrodes in the polarity-alternating fashion. When the liquid crystal display units are desired to be disabled, a signal either of the first or second level is applied to at least one of said electrodes.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
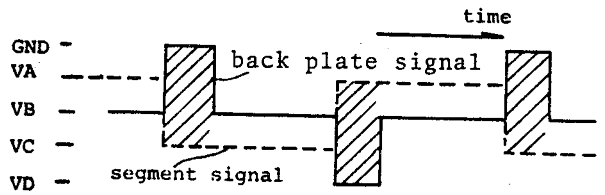
Fig.1 Prior Art
FIG. 1 illustrates waveforms showing a back plate signal and a segment signal occurring within the conventional liquid crystal drive system.

Referring now in detail to the drawings, and to facilitate a more complete understanding of the present invention, a liquid crystal drive system of the prior art will be first described with reference to FIG. 1.

First, second, third and fourth voltage levels $V_A$, $V_B$, $V_C$ and $V_D$ are determined in the decrementing order with respect to a reference level GND. A common electrode, namely, a back plate electrode of liquid crystal display units is connected to receive a back plate signal bearing the reference level GND, the second level $V_B$, and the fourth level $V_D$ as shown by a solid line in FIG. 1. The reference level GND and the fourth level $V_D$ are symmetrical to each other with respect to the second level $V_B$. Segment electrodes are connected to receive a segment signal bearing the first level $V_A$ and the third level $V_C$ as shown by a dotted line in FIG. 1. The liquid crystal display units are enabled for display at a desired segment of a desired digit upon application of a more than threshold voltage between the said electrodes as shown by oblique lines in FIG. 1. The less than threshold voltage is applied in an alternating fashion across a liquid crystal composition desired not to be selected. It will be clear from FIG. 1 that the liquid crystal drive circuit of the prior art must endure a voltage of about 24V which is higher than the threshold voltage of about 18V. Therefore, the liquid crystal drive circuit of the prior art can not be constructed with the use of CMOS's. When the CMOS's were desired to be used for fabricating the liquid crystal drive circuit in the prior art, it was necessary to provide an amplifier for amplifying the output signals of the liquid crystal drive circuit and then applying them to the liquid crystal display units.

Figure 2:
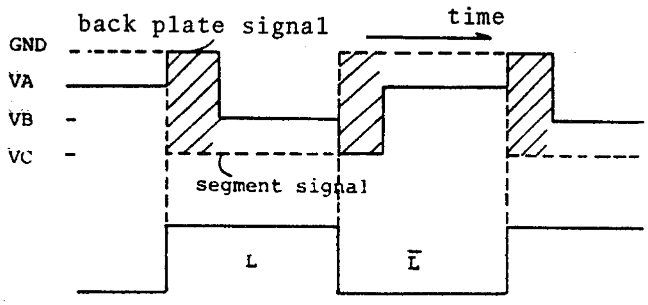
FIG. 2 illustrates waveforms showing a back plate signal and a segment signal occurring within a liquid crystal drive system of the present invention.

FIG. 2 schematically shows waveforms useful for the liquid crystal drive system of the present invention. First, second and third voltage levels $V_A$, $V_B$ and $V_C$ are determined in the decrementing order with respect to a reference level GND. The voltage difference between the reference level GND and the third level $V_C$ is selected slightly higher than the threshold voltage, namely, about 18V. The liquid crystal display units are driven through the use of the said first through third levels $V_A$, $V_B$ and $V_C$ and the reference level GND as shown in FIG. 2. The liquid crystal display units are enabled at the time shown by oblique lines in FIG. 2, wherein the segment signal is of waveform for enabling the corresponding segments of every digit for the purpose of simplicity and L, $\overline{L}$ represent control signals for driving the liquid crystal display units in the polarity-alternating fashion.

Figure 3:
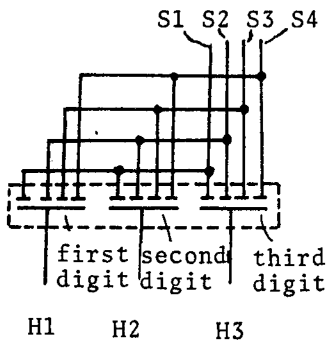
FIG. 3 is a schematic circuit diagram of liquid crystal display units driven by the liquid crystal drive system of the present invention.

Now assume for the purpose of simplicity that the liquid crystal display units of the present invention comprise three digits as shown in FIG. 3. The respective digits comprise four segment electrodes, respective of which are commonly connected each other to receive segment signals $S_1$, $S_2$, $S_3$ and $S_4$. Respective common electrodes are connected to receive back plate signals $H_1$, $H_2$ and $H_3$ the duty ratios of which are 1/3.

Figure 4:
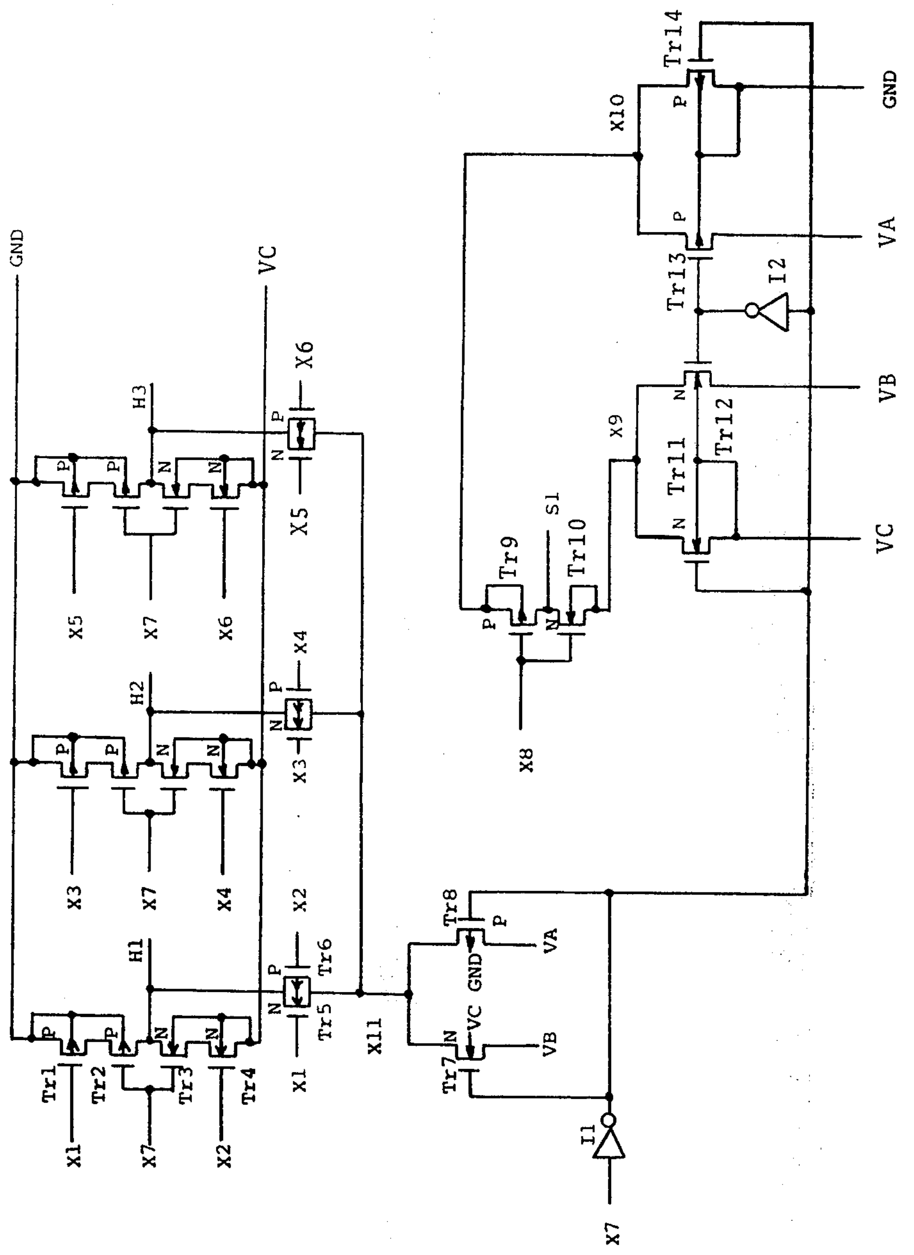
FIG. 4 is a circuit diagram embodying the liquid crystal drive system of the present invention.

FIG. 4 shows a typical circuit construction of the liquid crystal drive circuit of the present invention constructed through the use of CMOS's and wherein generation circuits for the segment signals $S_2$, $S_3$ and $S_4$ have been omitted for the purpose of simplicity since those segment signals can be provided in the same manner as for the segment signal $S_1$. The reference characters P and N represent a P-Channel MOS and a N-Channel MOS, respectively, which will be referred to as a "transistor" hereinafter. The liquid crystal drive circuit of FIG. 4 receives signals of the first through third voltage levels $V_A$ through $V_C$ and of the reference level GND, which are generated from a power circuit (not shown). The power circuit can be of a conventional construction and hence the details thereof have been omitted for the purpose of simplicity. The respective transistors function to provide the back plate signals $H_1$ through $H_3$ and the segment signals $S_1$ through $S_4$ by selecting the said voltage levels with the use of the switching operation of the CMOS's upon receiving signals X1 through X11. While the signals X1 through X8 are inputs to various logical elements, signals X9 through X11 are outputs from the logical elements.

Figure 5:
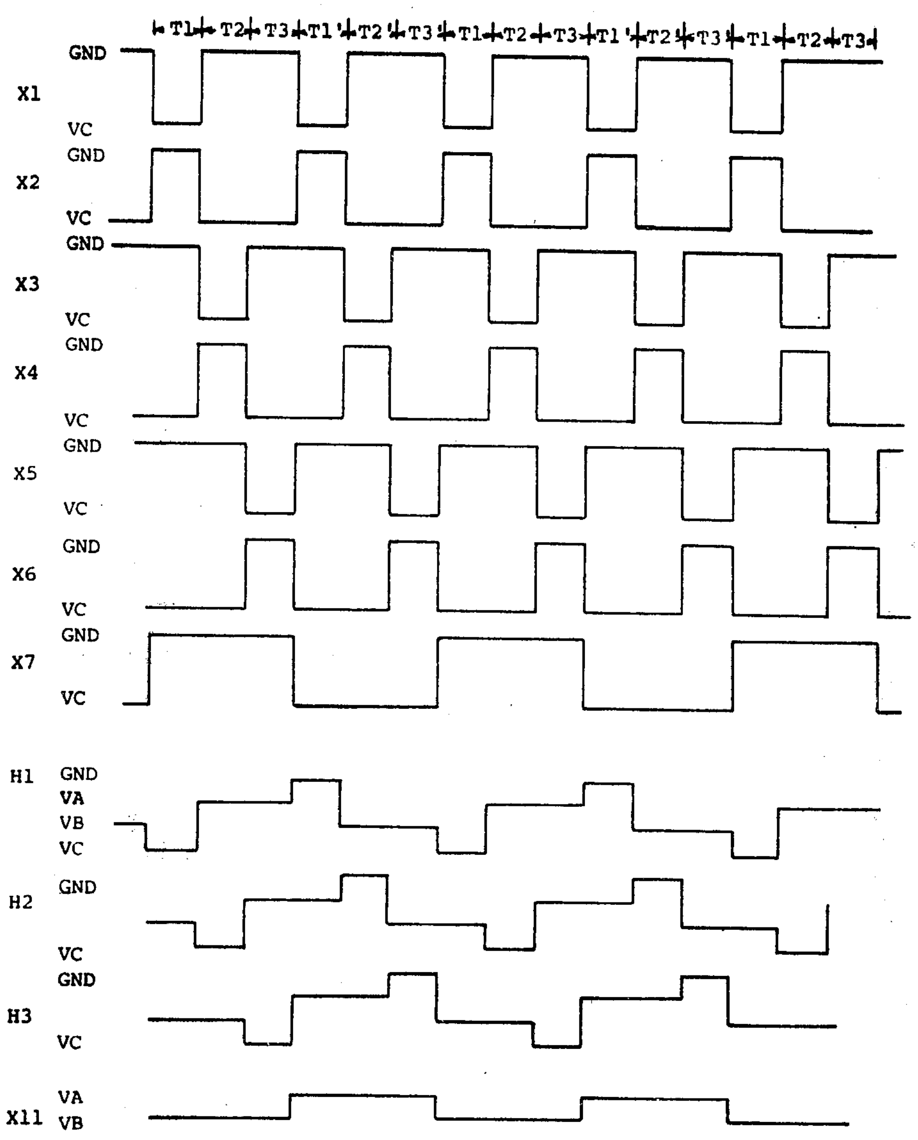
FIG. 5 is a time chart for the purpose of explanation of back plate signals $H_1$, $H_2$ and $H_3$ generated by the circuit of FIG. 4.
Figure 6:
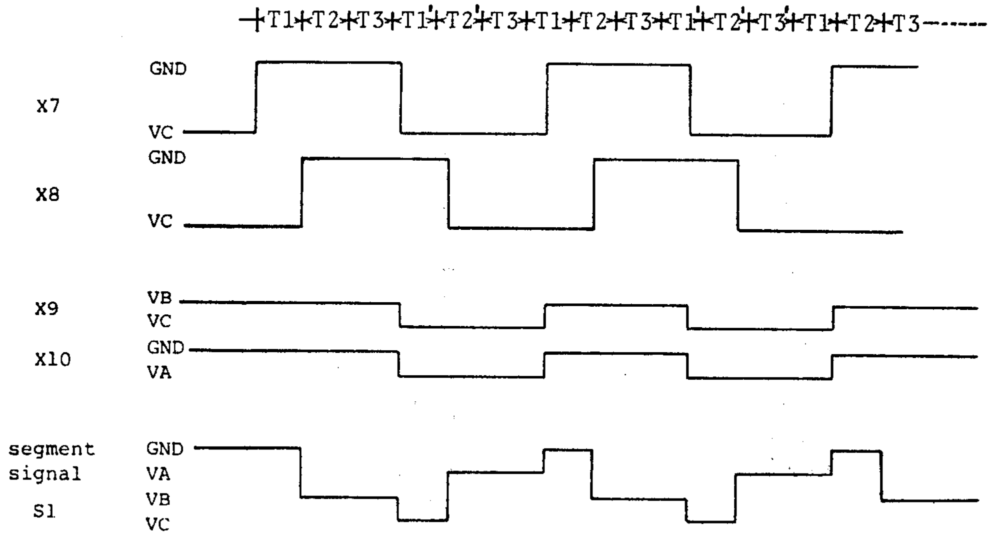
FIG. 6 is a time chart for the purpose of explanation of a segment signal $S_1$ generated by the circuit of FIG. 4.

The respective gates of the transistors are connected to receive the signals X1 through X11, waveforms of which are shown in FIGS. 5 and 6. The input signals X1, X3 and X5 are digit selection signals generated from a counter, and the input signals X2, X4 and X6 are inversion signals thereof. The input signal X7 a control signal for driving the liquid crystal display units in the polarity-alternating fashion. $T_1 - T_3$ and $T_1' - T_3'$ represent timings necessary for indicating the selection of the digits which are desired to be enabled, the affixed numbers corresponding to the desired digits.

Generation of the back plate signals $H_1$, $H_2$ and $H_3$ is as follows. The gate electrode of a transistor $Tr_1$ is connected to receive the signal X1, the gate electrodes of transistors $Tr_2$ and $Tr_3$ are connected to receive the signal X7, and the gate electrode of a transistor $Tr_4$ is connected to receive the signal X2, respectively. During the first digit selection period $T_1$, the transistors $Tr_3$ and $Tr_4$ are ON upon receiving the signals X2 and X7 and, therefore, the back plate signal $H_1$ bears the third voltage level $V_C$. The back plate signal $H_1$ is unaffected by the signal X11 since transistors $Tr_5$ and $Tr_6$ are OFF upon receiving the signals X1 and X2. A transistor $Tr_8$ and the transistors $Tr_5$ and $Tr_6$ are ON upon receiving the signal X7, which is inversion of the signal X7, through an inverter $I_1$, the signal X1, and the signal X2, respectively, during the second and third digit selection periods $T_2$ and $T_3$. The back plate signal $H_1$ bears the first voltage level $V_A$ because of turning ON of the transistor $Tr_8$. The back plate signal $H_1$ is unaffected by the reference level GND and the third level $V_C$ during the second and third digit selection periods $T_2$ and $T_3$, since the transistors $Tr_1$ and $Tr_4$ are OFF upon receiving the signals X1 and X2. During the first digit selection period $T_1'$, the transistors $Tr_1$ and $Tr_2$ are ON upon receiving the signals X1 and X7, and the transistor $Tr_3$ is OFF upon receiving the signal X7 and, therefore, the back plate signal $H_1$ bears the reference level GND. The back plate signal $H_1$ is unaffected by the signal X11 since the transistors $Tr_5$ and $Tr_6$ are OFF. During the second and third digit selection periods $T_2'$ and $T_3'$, the transistor $Tr_7$ receives the signal X7 via the inverter $I_1$, and hence the transistor $Tr_7$ is ON, and the signals X1 and X2 force the transistors $Tr_5$ and $Tr_6$ to be ON and, therefore, the back plate signal $H_1$ bears the second voltage level $V_B$. The back plate signal $H_1$ is unaffected by the reference level GND and the third level $V_C$ during the second and third digit selection periods $T_2'$ and $T_3'$, since the transistors $Tr_1$ and $Tr_4$ are OFF.

The back plate signal $H_1$ changes its level as described above, and the changing of its level is sequentially repeated, the repetition cycle of which consists of the time period $T_1$ through $T_3'$. It will be noted from FIG. 5 that the back plate signal $H_1$ alternatively bears the reference level GND and the third level $V_C$ during the first digit selection period $T_1$ and $T_1'$, and alternatively bears the first level $V_A$ and the second level $V_B$ during the second and third digit selection periods $T_2$, $T_3$ and $T_2'$, $T_3'$ in order to drive the first digit of the liquid crystal display units.

The back plate signals $H_2$ and $H_3$ for driving the second and third digits of the liquid crystal display units are generated in the same manner as for generating the back plate signal $H_1$ except the respective transistors receive the signals X3, X4 or X5, X6. The back plate signals $H_2$ and $H_3$ are of the same waveforms as the back plate signal $H_1$ except phase difference shifted to the right for one period as shown in FIG. 5.

Generation of the segment signals $S_1 - S_4$ to be applied to the segment electrodes of the liquid crystal display units will be described with reference to FIG. 6. In this description the generation mode of the segment signals $S_2 - S_4$ has been omitted for the purpose of simplicity, since the segment signals $S_2 - S_4$ can be provided in the same manner as for generating the segment signal $S_1$.

A segment selection signal X8 is generated by a decoder (not shown) for selecting the segment in accordance with the output signal from a register. In the time chart of FIG. 6, the segment selection signal X8 is of a waveform for selecting the segment receiving the segment signal $S_1$ within the first digit. The segment selection signal X8 bears the third level $V_C$ to enable the corresponding segment and bears the reference level GND to disable the corresponding segment in the liquid crystal display units. Both of the gate electrodes of transistors $Tr_9$ and $Tr_{10}$ are connected to receive the segment selection signal X8. The segment signal $S_1$ is generated at the junction of the transistors $Tr_9$ and $Tr_{10}$, and bears the voltage levels of the output signals X9 and X10 upon turning ON either of the transistors $Tr_9$ and $Tr_{10}$ in accordance with the voltage level of the segment selection signal X8. The signals X9 and X10 are waveforms shown in FIG. 6 and are generated upon applying the signal X7, which is inversion of the control signal X7, through the inverter $I_1$ to the gate electrodes of transistors $Tr_{11}$ and $Tr_{14}$, and applying the signal X7 through the inverter $I_1$ and another inverter $I_2$ to the gate electrodes of transistors $Tr_{12}$ and $Tr_{13}$. The signal X9 bears the second level $V_B$ upon turning ON of the transistor $Tr_{12}$ when the control signal X7 is at the reference level GND. The signal X10 bears the reference level GND upon turning ON of the transistor $Tr_{14}$ when the control signal X7 bears the reference level GND. The signal X9 bears the third level $V_C$ upon turning ON of the transistor $Tr_{11}$ when the control signal X7 bears the third level $V_C$. The signal X10 bears the first level $V_A$ upon turning ON of the transistor $Tr_{13}$ when the control signal X7 bears the third level $V_C$.

The segment signal $S_1$ bears the reference level GND during the first digit selection period $T_1$ since the transistor $Tr_9$ is ON. The segment signal $S_1$ bears the second level $V_B$ during the second and third digit selection periods $T_2$ and $T_3$ since the transistor $Tr_{10}$ is ON. The segment signal $S_1$ bears the third level $V_C$ during the first digit selection period $T_1'$ since the transistor $Tr_{10}$ is ON, and bears the first level $V_A$ during the second and third digit selection periods $T_2'$ and $T_3'$ since the transistor $Tr_9$ is ON. The segment signal $S_1$ repeatedly changes in level in a sequence of the time period $T_1$ through $T_3'$, as shown in FIG. 6.

Figure 7:
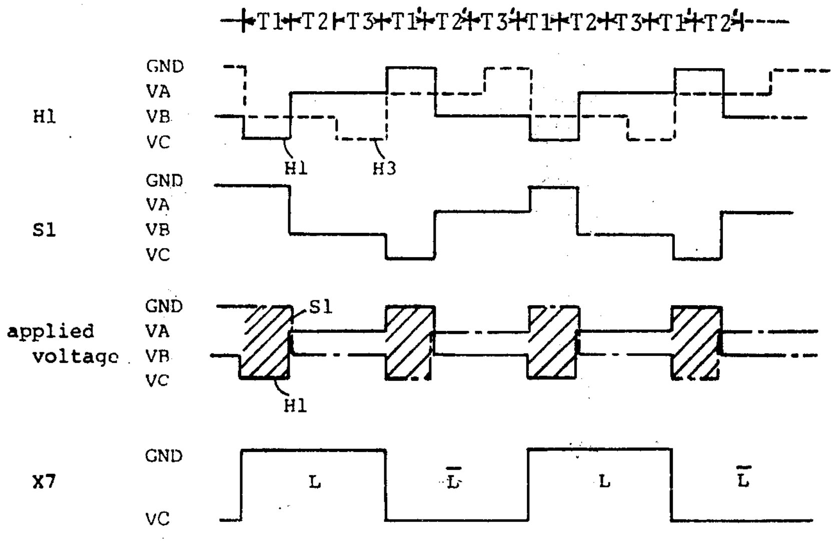
FIG. 7 is a time chart for the purpose of explanation of an applied voltage across the liquid crystal display units of FIG. 3.

FIG. 7 shows a voltage difference between the common electrode of the first digit receiving the back plate signal $H_1$ and the segment electrode of the first digit receiving the segment signal $S_1$. The segment of the liquid crystal display units is enabled during the time period shown by oblique lines in FIG. 7 since the liquid crystal composition interposed between the common electrode and the corresponding segment electrode is applied a voltage of GND-$V_C$ therethrough. It will be clear from FIG. 7 that the liquid crystal display units are driven in the polarity-alternating fashion in synchronization with the control signal X7. When the display is carried out in the dynamic scattering mode the first through third levels $V_A$, $V_B$ and $V_C$ are determined at −6V, −12V and −18V, respectively and, therefore, the liquid crystal display units are applied 18V therethrough when desired to be enabled.

Other digits and other segments are driven in the same manner as for driving the first digit, thereby performing the display in a time-sharing mode.

The liquid crystal drive circuit of the present invention can be constructed with the use of CMOS's since the liquid crystal display units can be driven through the use of the reference level GND and the first through third levels $V_A$, $V_B$ and $V_C$, the highest voltage difference among which is 18V. When the display is carried out in the field effect mode, the highest voltage differences among the reference level GND and the first through third levels $V_A$, $V_B$, $V_C$ is 9V. This may cause the reduction of the fabrication cost of the electronic apparatus employing the aforementioned liquid crystal display units.

Figure 8:
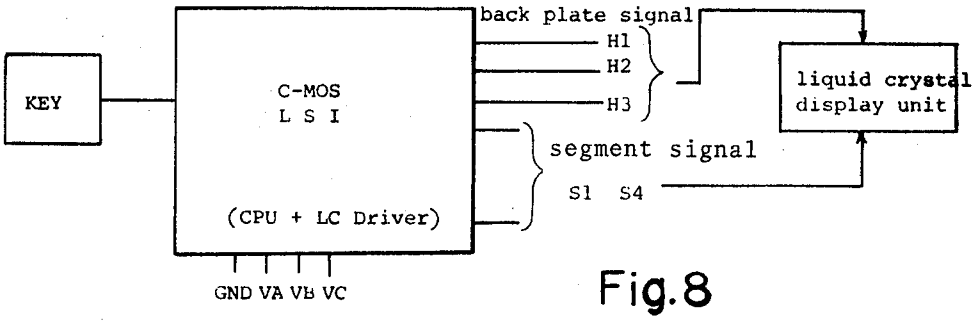
FIG. 8 is a block diagram of an example of an electronic calculator employing the liquid crystal drive system of the present invention.

The liquid crystal drive circuit of the present invention can be incorporated into one chip LSI which also comprises the central processor unit, namely, C.P.U. as shown in FIG. 8.

Figure 9:
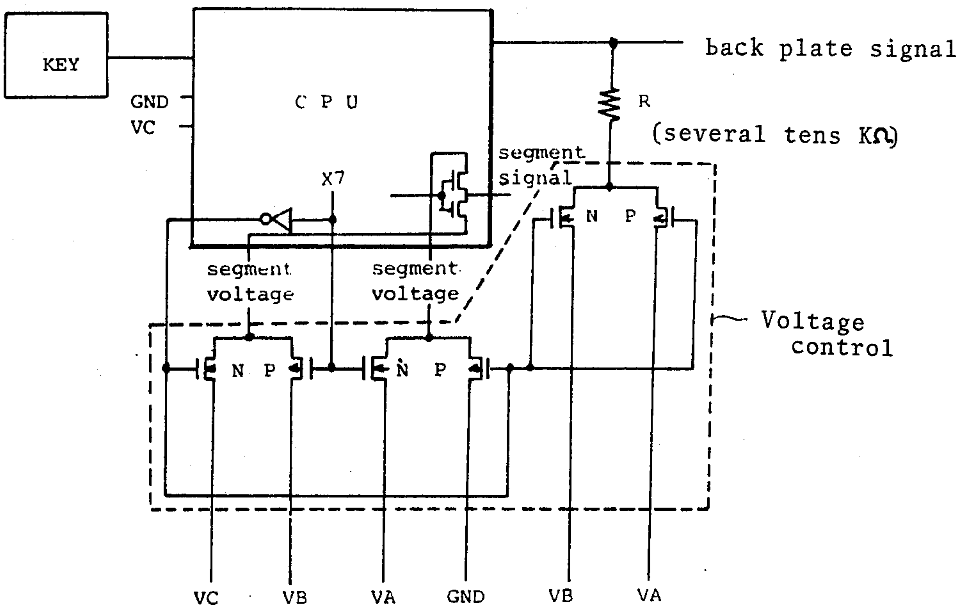
FIG. 9 is a block diagram of another example of an electronic calculator employing the liquid crystal drive system of the present invention.

FIG. 9 shows another example of the system wherein a portion of the liquid crystal drive circuit is constructed as an IC, which forms a voltage control VC, thereby enabling the control of the C.P.U. with a single voltage source Vc. In FIG. 9 a resistor R serves as an anologue switch instead of the transistors $Tr_5$ and $Tr_6$ of the circuit of FIG. 4.

The invention being thus described, it will be obvious that the same way be varied in many ways. Such variations are not to be regarded as a departure from the spirit and scope of the invention, and all such modifications are intended to be included within the scope of the following claims.

What is claimed is:

1. In a drive system for driving a liquid crystal unit including a common electrode, a plurality of segment electrodes, the combinations of which define display patterns, as well as liquid crystal composition between said common and said segment electrodes having a given threshold voltage value which initiates a change in the optical characteristics of said liquid crystal unit, said drive system being adapted to apply an alternating voltage higher than the threshold value to the liquid crystal unit when it is desired to be on, and to apply an alternating voltage higher than a reference potential but lower than the threshold value to the same when it is desired to be off, an improvement comprising;

means for establishing first, second and third potential levels other than the reference potential, the potential difference between the third level and the reference level being selected higher than the threshold value and the potential differences of the first and second potential levels with respect to the reference level being lower than the threshold value;

means for applying to the common electrode an alternating voltage alternating between the reference level and the third level and for applying to the segment electrodes an alternating voltage which alternates between the reference level and the third level in a phase opposite to the alternating polarity voltage applied to the common electrode, when the liquid crystal unit is desired to be on; and means for applying to at least one of the common electrode and the segment electrodes an alternating voltage which alternates between the first level and the second level, when the liquid crystal unit is desired to be off.

2. The liquid crystal display system of claim 1 wherein all of said means are incorporated in a single LSI.

3. The liquid crystal display system of claim 2 wherein the LSI is fabricated with the use of CMOS's.

* * * * *